Feb. 6, 1923.
A. B. FAULKNER
1,444,339
AUTOMATIC ILLUMINATED CHANGEABLE SIGN
Filed Nov. 9, 1920
4 SHEETS-SHEET 1
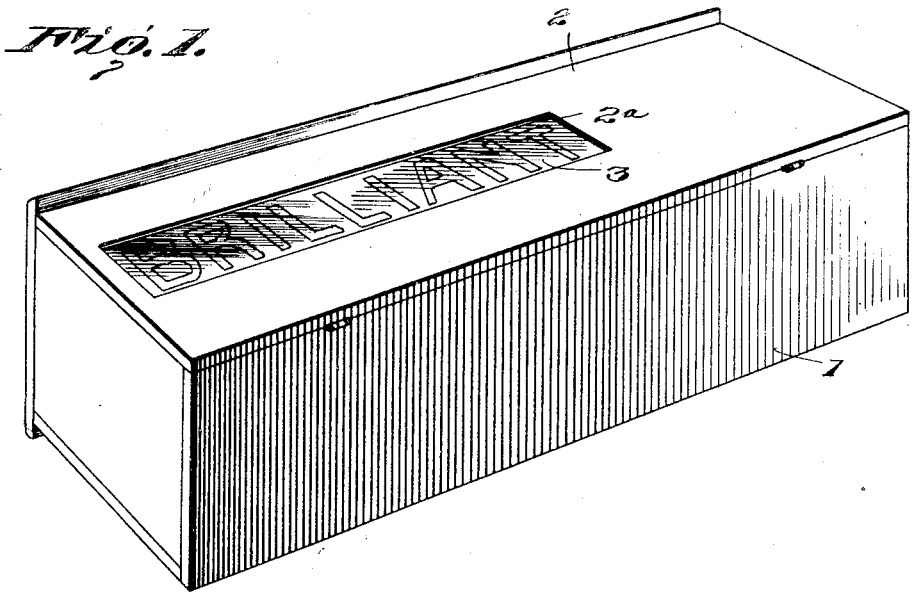
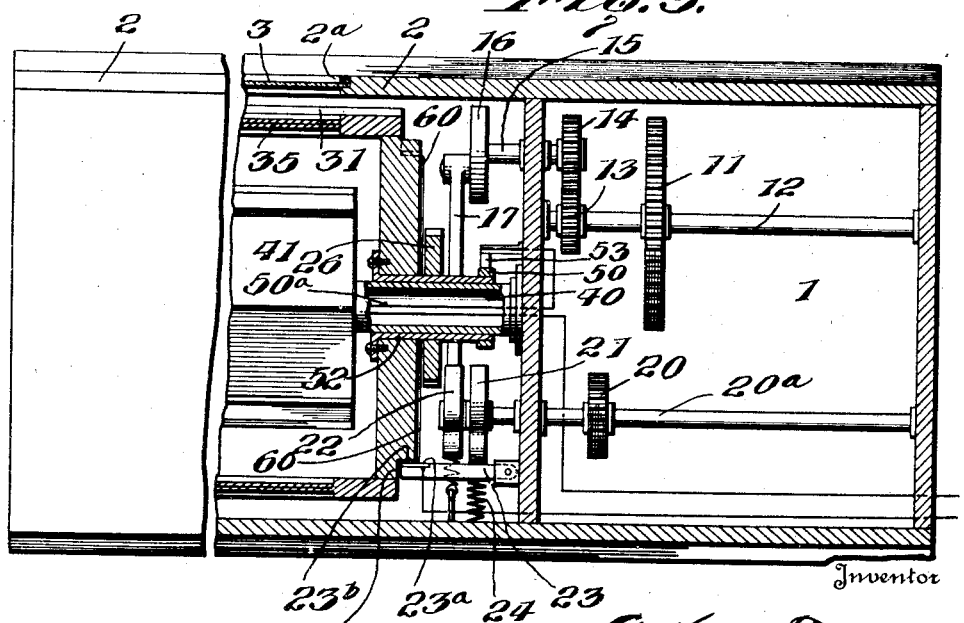

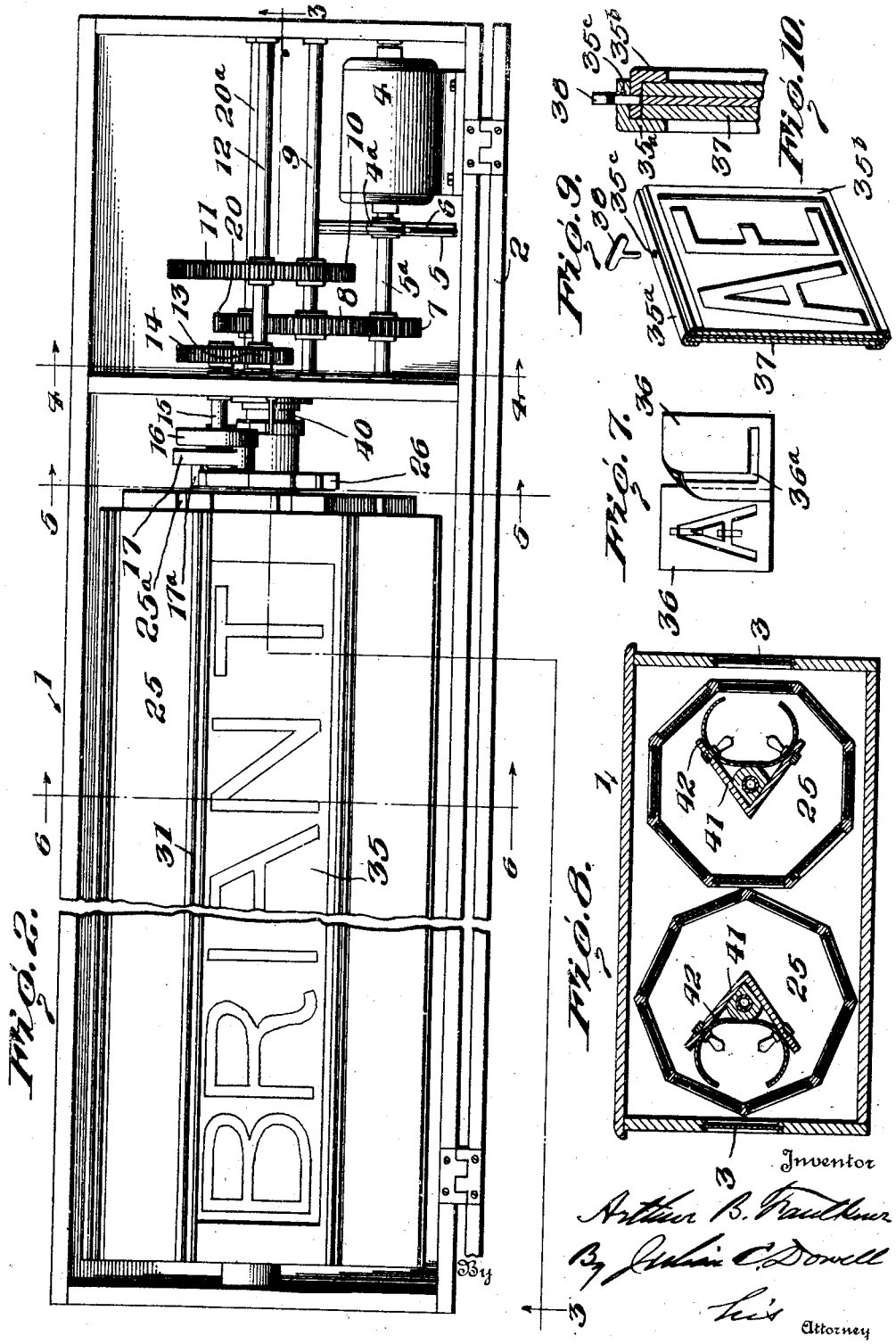

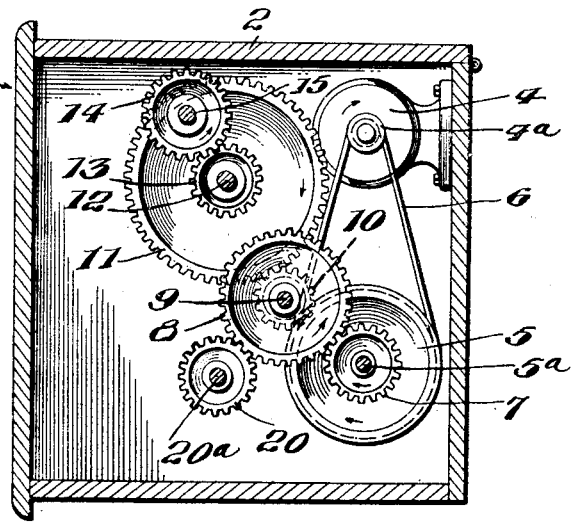
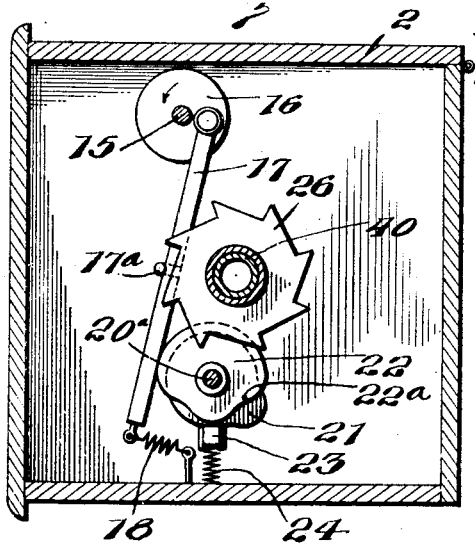
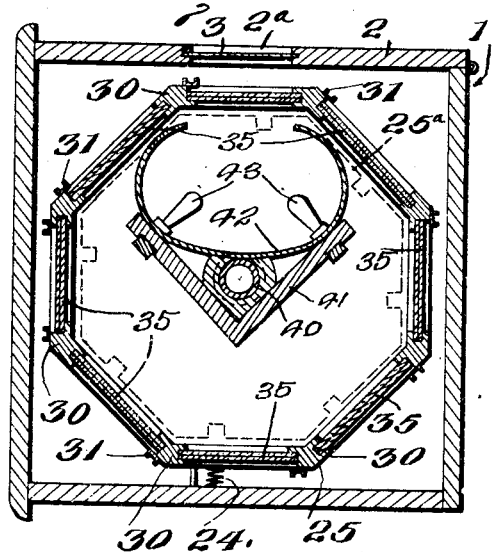

Feb. 6, 1923.
A. B. FAULKNER
AUTOMATIC ILLUMINATED CHANGEABLE SIGN
Filed Nov. 9, 1920
1,444,339
4 SHEETS-SHEET 4
Fig. 11.
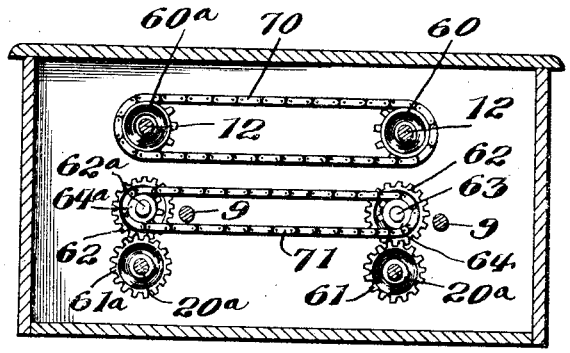
Fig. 12.
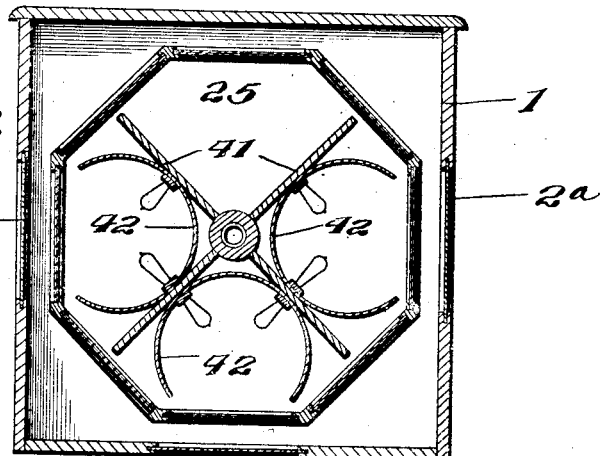
Fig. 13.
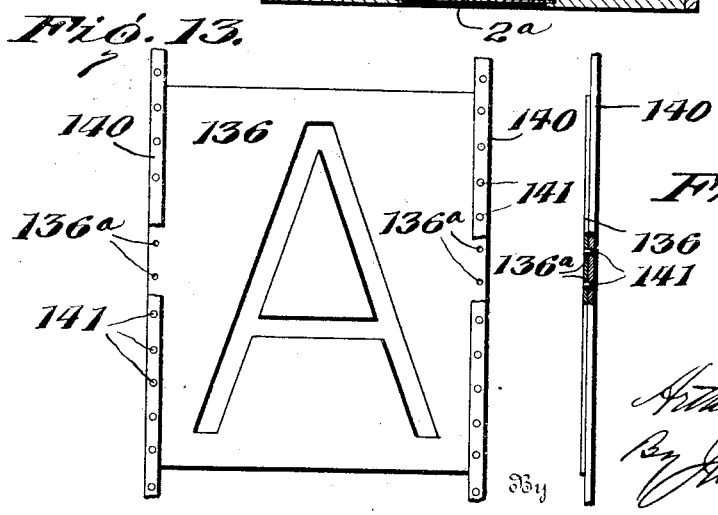
Fig. 14.
Inventor
Arthur B. Faulkner
By
His Attorney Patented Feb. 6, 1923.

1,444,339

UNITED STATES PATENT OFFICE.

ARTHUR B. FAULKNER, OF WILLIAMSPORT, PENNSYLVANIA.

AUTOMATIC ILLUMINATED CHANGEABLE SIGN.

Application filed November 9, 1920. Serial No. 422,917.

*To all whom it may concern:*

Be it known that I, ARTHUR B. FAULKNER, a citizen of Dominion of Canada, residing at Williamsport, in the county of Lycoming and State of Pennsylvania, have invented certain new and useful Improvements in Automatic Illuminated Changeable Signs; and I do hereby declare the following to be a full, clear, and exact description of the invention, such as will enable others skilled in the art to which it appertains to make and use the same.

The present invention relates to illuminated changeable exhibitors, and the objects of this invention are to provide an exhibitor which may be used as an illuminated sign at night and also as a day time sign.

A further object of the invention is to provide a sign wherein the electric current which furnishes the illuminating means may be periodically cut on and off at predetermined intervals in accordance with the operation of the sign.

A further object is to provide a sign which is adapted to contain a plurality of similar or different reading matter, and which is so arranged that it may show a portion of the reading matter successively on one or two sides of the structure.

A further object of the invention is to provide an exhibitor wherein two separate and distinct signs may be combined to work in unison within the same casing, and to alternately or simultaneously exhibit reading matter from opposite sides of the said casing.

A further object is to provide a changeable exhibitor which is controllable by an electric motor contained within the outer structure, and wherein the various parts forming the exhibitor as a whole are so arranged that they will operate in an improved and highly efficient manner, and form a device of this character which will serve to attract the attention of passers-by.

Referring to the drawings in which like reference numerals indicate like parts in the several views:

Fig. 1 is a perspective of the exterior casing of the sign;

Fig. 2 is a plan view of the same with the cover turned back;

Fig. 3 is a section on the line 3—3 of Fig. 2;

Fig. 4 is a section on the line 4—4 of Fig. 2;

Fig. 5 is a section on the line 5—5 of Fig. 2;

Fig. 6 is a section on the line 6—6 of Fig. 2;

Fig. 7 is a detail plan view of the letters forming the sign;

Fig. 8 is a section through a modified form;

Fig. 9 is a fragmentary perspective of the sign frame;

Fig. 10 is a section through the frame of Fig. 9;

Fig. 11 is a section through the modified form in Fig. 8 in a different plane;

Fig. 12 is a section through another modified form;

Fig. 13 is a plan view of a modified form of letters supporting means.

Fig. 14 is a scoss-section through Fig. 13.

Referring to the drawings, 1, indicates the outer casing which encloses the signs, and the operating means therefor. This casing, 1, has a hinged cover, 2, on one side of the same so that it may be opened to permit of access to the interior. A recess $2^a$ is formed in the side 2, of the casing and transparent material 3 is placed in this opening to permit the characters of the sign to be viewed. Located in the upper portion of the casing is an electric motor, 4, which supplies movement to the sign enclosed within the casing. The motor 4 carries on one end a belt wheel $4^a$, which is connected to a pulley wheel 5 by means of a belt, 6. The pulley wheel 5 is fixedly mounted on the shaft, $5^a$ and the said shaft carries near its lower extremity a gear wheel, 7, which in turn meshes with a gear wheel, 8, on the shaft 9. The shaft, 9, carries a smaller gear wheel, 10, which in turn meshes with the large gear, 11 on the shaft 12.

The shaft 12, further carries a gear wheel, 13, which meshes with a gear wheel, 14, on the shaft, 15. A crank wheel, 16, is mounted on the shaft, 15, below the gear wheel, 14, and connected to this crank wheel is the crank arm, 17. A spring, 18, is attached to the opposite end of the crank arm, 17, for purposes as will be hereinafter more fully explained. The gear wheel, 8, meshes with a gear wheel, 20, on the shaft, $20^a$, and mounted on this same shaft are the cam wheels, 21, 22. The cam wheel, 21, controls the lock and switch for the casing; said lock and switch being embodied in the single pivoted arm 23, backed by the spring, 24, carrying the contact member 23$^a$ which is adapted to cooperate with a similar contact member 23$^b$ on the sign. The arm 23, is adapted to enter into one of a series of notches 25$^a$ on the upper portion, of the sign, 25, thus retaining the sign in fixed position when the arm 23 lies within a notch on the sign. The arm 23 is acted upon by the cam surface of the cam wheel, 21, and is held by said cam wheel out of engagement with the notches in the sign, except when the indented portion of the cam wheel arrives at the point of contact of the arm, 23, whereupon the arm 23, under the tension of the spring, 24, will move towards the sign, and will engage one of the notches thereon, and at the same time the contact 23$^a$, will engage the corresponding contact 23$^b$ on the sign completing the illuminating circuit.

Referring to Fig. 5 the cam wheel, 22, which is mounted on the shaft 20$^a$, carrying the cam, 21, just referred to, is adapted to bear against the crank, 17, and hold the same against the tension of the spring in a projected position, but which will permit the said crank arm to move under the impetus of the spring to its normal position, when the indented portion, 22$^a$, of the cam arrives in proper position. Carried by the crank arm, 17, is a pin, 17$^a$, and carried by the sign, 25, is a sprocket wheel, 26. The pin, 17$^a$, is adapted to normally engage one of the teeth of the sprocket wheel 26, during the reciprocating movement of the arm 17 but is held from such engagement by means of the cam face of the cam wheel, 22, during the time when said cam face is engaging the crank arm. When the indented portion, 22$^a$, of the cam wheel arrives adjacent the crank arm, the said crank arm will move towards the sprocket wheel, and on the next outward movement of the said crank arm the pin, 17$^a$, will engage one of the teeth of the sprocket wheel, thereby imparting rotary movement to the sign in the same direction. Since there are eight teeth on the sprocket wheel in the present case and eight faces of the sign, 25, during the movement of the arm, 17, with its pin, 17$^a$, in engagement with the sprocket wheel, the said sprocket wheel and the sign will be moved one-eighth of a revolution, thereby presenting a new sign surface to view. As stated, the sign proper comprises, in the present case, an octagonal body enclosed wtihin the casing 1, and on each face of the sign is placed certain reading matter. Since there is no opening in the casing, except the opening, 2$^a$, covered by the transparent material, 3, the reading mater of the sign is visible only at this point, and the said reading matter will be presented to view at this point in succession as heretofore described. If desired, an additional opening can be made in the opposite face or in any other face of the casing, and the reading matter exhibited at that point in like manner. Since the cam wheels, 21 and 22, are both mounted on the same shaft, they receive the same ratio of rotation, and they are so arranged on this shaft that the indented portion of one is opposite to the indented portion of the other, so that while the indented portion of the cam wheel, 21, is allowing the arm 23, to contact with the sign and hold the same against rotation, and at the same time make electrical contact so that the electric bulbs within the sign are illuminated, the cam surface of the cam wheel, 22, is engaging the crank arm, 17, and preventing the same from contacting with the sprocket wheel, 26. When the cam surface of the cam wheel 21 engages the pivoted arm 23, and moves the same from contact with the sign, thereby breaking the electrical contact and releasing the locking means, the indented portion of the cam wheel, 22, is arriving adjacent the crank arm, 17, and will thereupon permit the said crank arm to move towards the sprocket wheel, 26, and turn said sprocket wheel on its succeeding movement, thereupon turning the sign and presenting the next successive reading matter to view, whereupon the illuminating means will again be switched on as a result of the cam 21, as heretofore described. It will thus be seen that the sign is only illuminated at such times as the sign is stationary, presenting the reading matter thereon to the view of an observer, and the illuminating means is switched off at the time the sign is rotating to change the reading matter, and is kept off until the sign again becomes stationary.

Referring to Fig. 6, wherein I have shown in detail, the construction of the sign proper, the sign comprises an octagonal body formed of a series of vertical channeled bars, 30. One face of each bar has a U-shaped channel formed therein, and the opposite face has an L-shaped channel formed therein, and mounted between the bars are the frames, 35, containing the reading matter. The frames are placed in the sign by inserting one edge of the frame in the U-shaped channel of one bar and the opposite face in the L-shaped channel of the next succeeding bar. A pivoted locking member, 31, is attached to each bar adjacent the L-shaped channel therein, and this locking member is turned into engagement with the exterior face of the frame resting in the L-shaped channel, thereby retaining the said frame firmly in position between the bars. The sign 25 revolves as heretofore described, and mounted interiorly of the sign is the fixed post, 40, carrying the illuminating means. The illuminating means comprises an L-shaped frame, 41, attached to the post, 40, and this frame supports a curved reflector, 42. The ends of the said reflector are so arranged that the space between them is equal to only slightly more than the width of one of the frames, 35, and by reason of its curved form all light projected by the said reflector is projected only through the particular frame opposite it, and no light will pass in any other direction through any other portion of the sign or casing. A plurality of bulbs, 43, are mounted within the reflector, and these may be arranged in any suitable manner and in any suitable number as desired.

In connection with the present invention attention is directed to the construction and arrangement of the frames, 35, reference being had to Figs. 9 and 10. The frame comprises a member, 35ª, of L-shaped cross section, and a coacting member 35ᵇ. The sign is formed preferably, although not necessarily, of a series of independent letters, 36, preferably formed of opaque material with the exception of the translucent portion, 36ª, forming the letter itself. The letters are clamped between two sheets of glass, 37, after having been arranged in any desired sequence, and the assembly is placed within the member, 35ᵇ, and the latter is thereupon inserted into cooperative engagement with the member, 35ª, as shown in Fig. 12, whereupon a key or other locking means, 38, is inserted in coacting openings, 35ᶜ, in the members, 35ª and 35ᵇ, thereby locking the two members firmly together. The frame is then inserted between the bars of the sign as has been heretofore described. If the sign is mounted on a horizontal axis the letter members 36 may be placed in frictional engagement with each other and with the sheets of glass and will be retained in said position, but if the sign be mounted on a vertical axis it will be found necessary to provide a series of retaining devices illustrated in Figs. 13, and 14. In this modified form the letters 136 have a series of holes 136ª in their vertical edges, and two strips 140 bearing a series of pins 141 are adapted to engage the sides of each letter, the pins entering the holes in the letter. These strips 140 are clamped between the frame members 35ª, 35ᵇ. As has been heretofore stated this modified form of letter and retaining means is exclusively for use when the sign is mounted on a vertical axis.

If it is desired to show colored reading matter, it is only necessary to use sheets of glass suitably colored or to provide a colored glass in lieu of the plain glass, 3.

Referring to Fig. 3, I have shown the preferred form of electrical wiring arrangement, and I will briefly describe the same.

Current is received from the contact member, 23ª, which will form a contact with a contact member 23ᵇ on one of the wires, 60, which it abuts, and the current is transmitted to the sleeve 52 of the sign. A brush, 53, contacts with a contact ring, 50, on the sleeve 52. The current, therefore, passes to the ring, 50, and from that to the bulbs, 43, by means of the wires 50ª.

Referring to Figs. 8 and 11, wherein I have shown a double sign, the arrangement of the sign proper is the same as that described for the single sign. In the present case the double signs are both operated by a single electric motor, and in order to accomplish this I have provided the following arrangement of gearing:

A small gear wheel 60, is mounted at the upper end of the shaft 12, which controls the sign rotating means 16 and 17. A second gear wheel 61 is placed at the top of the shaft 20ª which carries the switching and rotating cams 21, 22. The same mechanism is duplicated for the second sign, and a gear wheel 60ª corresponding to the gear wheel 60 of the first sign is mounted upon a shaft 12 which controls a like revolving means in the second sign. The gear wheel 61 upon the shaft 20ª meshes with a gear 62 mounted upon a shaft 63 attached to the top of the casing, and this shaft 63 carries a smaller gear wheel 64. The same mechanism is duplicated in the second sign, the latter having a gear wheel 61ª mounted upon the shaft 20ª carrying the cams which meshes with a gear 62ª, which is in turn mounted upon the same shaft as the gear 64ª. A sprocket chain 70 connects with gear wheels 60 and 60ª and a sprocket chain 71 connects the two gear wheels 64 and 64ª. By this arrangement movement at the same speed is transmitted to the second sign, and the two signs are operated in unison, and being illuminated either alternately or simultaneously.

In Fig. 12 I have illustrated a single sign in which there are three sources of illumination, and likewise three openings in the casing 1. The operation of this sign is the same as that of the single sign shown in Fig. 1, but by reason of the three openings in the casing and the three sources of illumination, each face of the sign is alternately exhibited at each of the openings, 2ª. It will also be seen that reading matter will be exhibited at each of these openings simultaneously, and that the reading matter will progress from one opening to another, and that a continuous variety of reading matter is shown at each of the three openings.

Having thus described my invention what I claim as new and desire to secure by Letters Patent is:

1. An exhibiter comprising a stationary casing, an opening in one wall of said casing, transparent material covering said opening, a motor within the casing, a sign adapted to revolve within said casing, means whereby said motor will periodically revolve the sign, said means comprising a sprocket wheel on the sign, a crank arm having a pin adapted to engage said sprocket wheel, means for imparting movement to said crank arm, a cam adapted to periodically hold said crank arm out of engagement with said sprocket wheel, illuminating means interiorly of the sign, a switch controlling said illuminating means, and means whereby electric current passes to said illuminating means only when the sign is stationary.

2. An exhibiter comprising a stationary casing, an opening in one wall of said casing, transparent material covering said opening, a sign having a plurality of faces adapted to revolve interiorly of said casing, a motor, illuminating means interiorly of the sign, a switch controlling said illuminating means, means whereby said motor will periodically revolve the sign, means controllable from said motor for operating said switch, said means comprising a cam wheel having a cam surface adapted to engage said switch and break the circuit during the revolution of the sign.

3. An exhibiter comprising a stationary casing, an opening in one wall of said casing, transparent material covering said opening, a closure for the casing whereby access may be had to the interior thereof, a sign within the casing, transparent reading matter on said sign, a motor within the casing, gearing between said motor and the sign whereby the latter is revolved, means for periodically controlling the revolution of said sign, locking means for the sign, said locking means being periodically released by said motor, illuminating means interiorly of the sign, a switch controlling said illuminating means, said switch being periodically operated by the motor, the operation of the revolving means and the operation of the switch being so co-ordinated that circuit is made by the switch only when the sign is stationary.

4. A sign comprising a stationary casing having an opening in one wall thereof, transparent material covering said opening, a closure whereby access may be had to the interior of the casing, a multi-faced sign adapted to revolve within the casing, removable transparent reading matter on each face of said sign, a motor within the casing, a sprocket wheel on the sign, a reciprocating arm having a pin adapted to engage the teeth of said sprocket wheel, a cam wheel having a cam surface adapted to periodically prevent engagement between said arm and the sprocket wheel, gearing between the motor and said cam wheel whereby the latter is revolved, a locking device for the sign, stationary illuminating means interiorly of the sign, a reflector adapted to project illumination through the sign, a switch controlling said illuminating means, a cam adapted to periodically engage said switch and break the illuminating circuit, gearing between the motor and the said cam whereby the latter is operated, the gearing between the motor and the revolving means and the gearing between the motor and the said last named cam being so co-ordinated that the switch is operated and the circuit broken during revolution of the sign and the switch allowed to make contact and illuminate the sign while the sign is stationary.

In testimony whereof I affix my signature in the presence of two witnesses.

ARTHUR B. FAULKNER.

Witnesses:
R. H. HELLER,
DOLLY CANNON.